US006865391B1

(12) United States Patent
Oh et al.

(10) Patent No.: US 6,865,391 B1
(45) Date of Patent: Mar. 8, 2005

(54) METHOD AND SYSTEM FOR VOCODER BYPASS USING ELECTRONIC SERIAL NUMBERS

(75) Inventors: Dae-Sik Oh, Overland Park, KS (US); Deuk-Ho Ryu, Lenexa, KS (US); Leo Ray Anderson, Raymoore, MO (US); Shiva Narayanabhatla, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 42 days.

(21) Appl. No.: 10/193,054

(22) Filed: Jul. 11, 2002

(51) Int. Cl.[7] .......................... H04Q 7/20; H04L 12/66; G10L 19/12
(52) U.S. Cl. ...................... 455/445; 455/560; 370/352; 370/355; 370/356; 704/221
(58) Field of Search ................................ 455/560, 445, 455/419, 418, 456.5, 466; 370/352, 355, 356, 522, 454, 422, 441; 704/221

(56) References Cited

U.S. PATENT DOCUMENTS

| | | | | |
|---|---|---|---|---|
| 5,608,779 A | * | 3/1997 | Lev et al. ................. | 455/436 |
| 5,793,810 A | * | 8/1998 | Han et al. ................. | 375/242 |
| 6,070,089 A | * | 5/2000 | Brophy et al. ............ | 455/560 |
| 6,091,969 A | | 7/2000 | Brophy et al. | |
| 6,185,424 B1 | * | 2/2001 | Pon et al. ................. | 455/445 |
| 6,215,996 B1 | * | 4/2001 | Fujita ...................... | 455/422.1 |
| 6,256,612 B1 | * | 7/2001 | Vo et al. .................. | 704/500 |
| 6,272,358 B1 | * | 8/2001 | Brent et al. .............. | 455/560 |
| 2002/0098833 A1 | * | 7/2002 | Sennett .................... | 455/419 |
| 2002/0191693 A1 | | 12/2002 | Nakagaki | |
| 2003/0012221 A1 | | 1/2003 | El-Maleh et al. | |
| 2003/0125960 A1 | | 7/2003 | Chu et al. | |

OTHER PUBLICATIONS

Copy of International Search Report prepared for PCT Application No. PCT/US03/21196, dated Oct. 2, 2003.
Copy of International Search Report prepared for PCT Application No. PCT/US03/21308, dated Oct. 3, 2003.
3rd Generation Partnership Project 2 "3GPP2", Tandem Free Operation (Stage 1), 3GPP2 S.R0014, Dec. 13, 1999.
3rd Generation Partnership Project 2 "3GPP2", 3GPP2 Tandem Free Operation Specification, 3GPP2 A.S0004–A Release A, Jun. 13, 2001.
Airtouch™ Communications, Overview of IP Based Wireless Network Concepts, S00allip–20000106–003 (VFAT), pp. 1–11, dated before Jul. 11, 2002.

* cited by examiner

*Primary Examiner*—David Hudspeth
*Assistant Examiner*—S. Smith

(57) ABSTRACT

A system and method are provided for using electronic serial numbers (ESNS) to determine whether to perform vocoder bypass. In an exemplary embodiment, a terminal device may share a common mobile identification number (MIN) with other terminal devices. The terminal device may answer a page and provide its ESN to an intermediate entity. The intermediate entity may query a database to determine whether the answering terminal device is a mobile station. The intermediate entity may perform vocoding if the answering terminal device is a non-mobile station, or vocoder bypass if the answering terminal device is a mobile station.

19 Claims, 3 Drawing Sheets

METHOD AND SYSTEM FOR VOCODER BYPASS USING ELECTRONIC SERIAL NUMBERS

FIELD OF THE INVENTION

The present invention relates to wireless communications and, more particularly, to a method and system for determining when to bypass the normal vocoder resident in a wireless communication system.

BACKGROUND OF THE INVENTION

I. End-to-end Communication

In a typical wireless communication system, a mobile station may digitize and encode an analog voice signal received from a user for transmission over an air interface to a radio access network. A base station controller ("BSC") within the radio access network may decode the encoded voice signal and send a digital representation of the voice signal to a network switch for transmission to another endpoint.

Similarly, the radio access network can receive a digital representation of a voice signal destined for a mobile station. The BSC within the radio access network would then encode the digital representation for transmission over the air interface to the mobile station. The mobile station may then decode the encoded voice, convert the underlying digital representation to an analog signal, and output the analog signal to a user.

When a voice call is placed between two mobile stations, the system is inherently inefficient, because the system will unnecessarily perform back-to-back decoding and encoding of data. Namely, a sending mobile station would encode a voice signal for transmission to an originating BSC. The originating BSC then decodes the voice signal sent from the mobile station, and sends the decoded signal through the radio access network to a receiving BSC, which could be the same as the original BSC. The receiving BSC would then encode the voice signal and transmit it to a receiving mobile station, which would then decode the voice signal. This back-to-back "vocoding" (voice decoding and/or encoding) can degrade signal quality and delay voice transmission.

II. Vocoder Bypass

One mechanism that can be used to overcome this problem is known as "tandem free operation" ("TFO") or "vocoder bypass." According to this mechanism, if a voice call is a mobile-to-mobile call (i.e., between mobile stations), then data may be passed transparently through the network between the mobile stations without back-to-back vocoding. On the other hand, if the voice call is between a mobile station and a non-mobile station, then the data may be vocoded for transmission to a switch serving the non-mobile station.

In processing a call, the network can determine whether a given call is mobile-to-mobile by looking up telephone numbers of the endpoints of the call in a database that correlates the telephone numbers with device types. If the database indicates that the telephone numbers for both terminating endpoints of a call correspond to mobile stations, the network may conclude that the call is a mobile-to-mobile call and could then perform vocoder bypass.

However, existing methods for determining whether to perform vocoder bypass may have a number of disadvantages. For example, such methods can have relatively long delays associated with looking up telephone numbers in a database. In another example, a mixture of mobile and non-mobile devices may share the same telephone number. In such a situation, the intermediate entity would be unable to readily determine whether a device is mobile or non-mobile simply by looking up its shared telephone number in a database. Therefore, the intermediate entity's inability to determine whether a device is mobile or non-mobile would cause difficulties when determining whether to perform vocoder bypass.

SUMMARY

In an exemplary embodiment, a method for performing vocoder bypass may include receiving a request to establish a call from a first station of a first device type to a second station of a second device type. Additionally, the method may include receiving an electronic serial number from the second station and using the electronic serial number to determine whether the second device type is the same as the first device type. In addition, the method may include performing vocoder bypass if the second device type is the same as the first device type.

In another exemplary embodiment, a method for establishing a call may include receiving from a first mobile station a request to establish a call to a group of terminal devices sharing a common identifier. In addition, the method may include paging each member of the group of terminal devices with the common identifier. Furthermore, the method may include receiving an electronic serial number from an answering terminal device within the group of terminal devices in response to paging each member of the group. The method may also include querying a database using the electronic serial number to determine whether the answering terminal device is a second mobile station.

In yet another exemplary embodiment, an intermediate system may communicate with a first mobile station and a terminal device. The intermediate system may include an intermediate entity having a codec for performing vocoding and a bypass mechanism. Further, the intermediate system may include a database mapping electronic serial numbers of a plurality of devices to a type for each device. Additionally, the intermediate entity may receive an electronic serial number from the terminal device and determine a type of the terminal device by querying the database with the electronic serial number. Furthermore, the bypass mechanism may prevent the codec from performing vocoding if the terminal device is a second mobile station.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF EXEMPLARY EMBODIMENTS

I. Exemplary vocoder bypass using ESNs

According to an exemplary embodiment, a manufacturer may assign a unique electronic serial number ("ESN") to each member of a group of terminal devices. Additionally, all of the members of the group of terminal devices may share a common identifier, such as a mobile identification number ("MIN"). When a mobile station calls the common identifier, an intermediate entity may page the terminal devices within the group using the common identifier. A terminal device within the group may answer the page and provide its ESN to the intermediate entity. A terminal device can be, for example, a mobile station such as a cellular phone, personal digital assistant ("PDA"), two-way pager, laptop computer, or portable facsimile machine. Additionally, the terminal device may be a non-mobile station, such as a landline rotary telephone, landline touch-tone telephone, desktop computer, or facsimile machine. A terminal device that responds to the page from the intermediate entity may be referred to as an "answering terminal device".

The intermediate entity may then query a database of device types with the ESN of the answering terminal device to determine whether the answering terminal device is a mobile station. The intermediate entity may also notify other network entities through signaling such as Integrated Services Digital Network User Part ("ISUP") signaling if the answering terminal device is a mobile station. The intermediate entity and/or other network entities may then perform vocoding if the answering terminal device is a non-mobile station, or vocoder bypass if the answering terminal device is a mobile station. Thus, the present embodiments may enable a network to distinguish between mobile and non-mobile terminal devices that share a common MIN (e.g., telephone number) by using unique ESNs. Furthermore, these embodiments may provide a simpler and cheaper mechanism for determining when to apply vocoder bypass within existing wireless networks.

II. Exemplary network system

Figure 1:
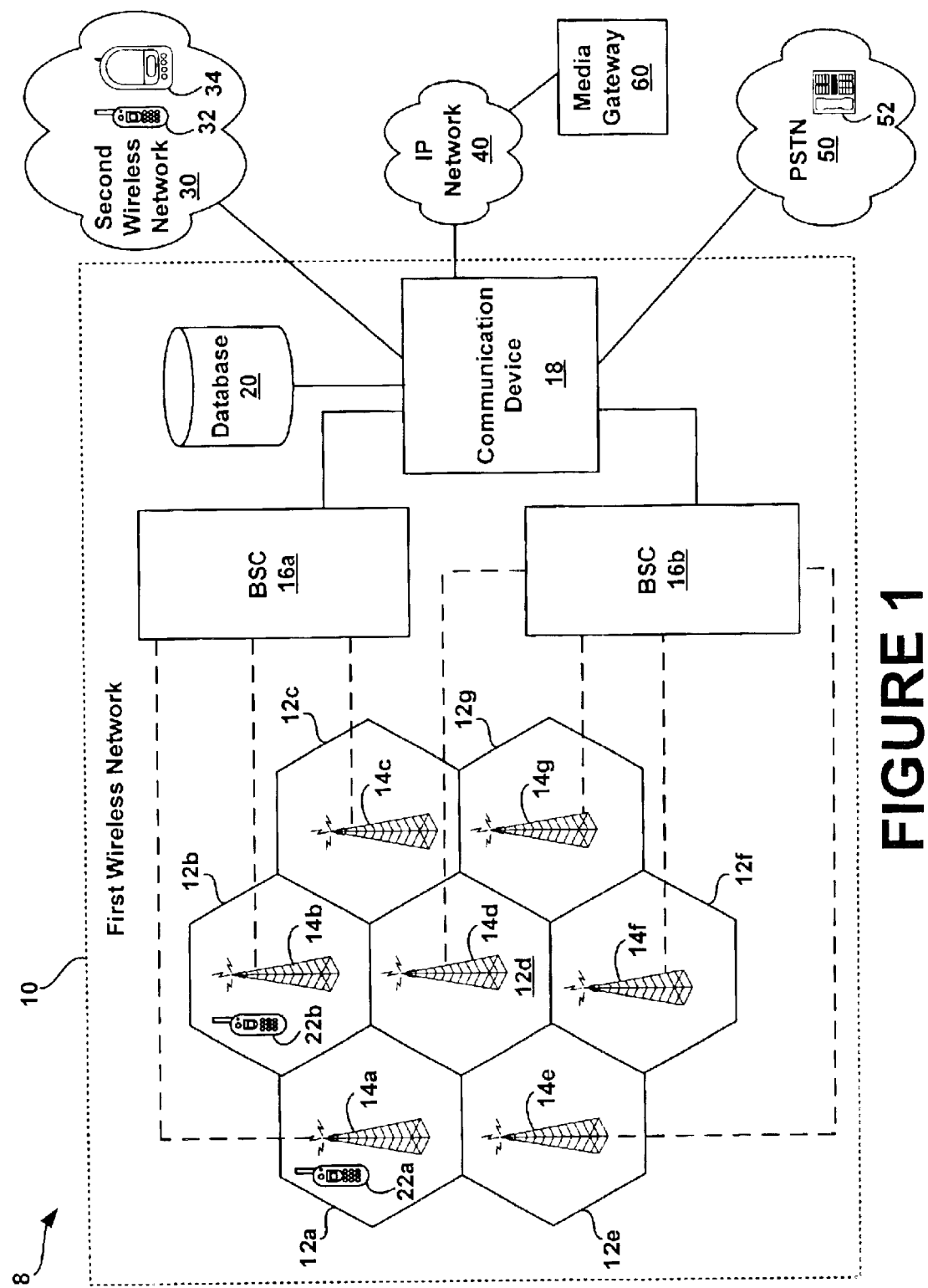
FIG. 1 shows an exemplary embodiment of a network system.

FIG. 1 is a simplified block diagram that illustrates an exemplary network system 8, such as can be used for performing vocoding and vocoder bypass. The network system 8 may include a first wireless network 10 in communication with a second wireless network 30, an Internet Protocol ("IP") network 40 (e.g., the Internet), and a Public Switched Telephone Network (PSTN) 50. Additionally, a media gateway 60 in communication with the IP network 40 may enable other networks (e.g., additional PSTNs or wireless networks) to send and receive data with the IP network 40, and in turn with the first wireless network 10.

A. Exemplary wireless network

In the present embodiment, the first wireless network 10 uses Code-Division Multiple Access ("CDMA") technology, though other types of wireless technologies, such as Time-Division Multiple Access ("TDMA"), Frequency-Division Multiple Access ("FDMA"), Wideband CDMA ("W-CDMA"), Global System for Mobile Communications ("GSM"), 802.11, and Bluetooth, may also be used. Furthermore, the network 10 may include multiple cells 12a–g, each of which is defined by a radio frequency ("RF") radiation pattern from a respective base transceiver station ("BTS") 14a–g. FIG. 1 depicts each of the cells 12a–g in an idealized fashion, as hexagons that do not overlap. Alternatively, however, the cells 12a–g may overlap and vary widely in shape and size due to topography, signal strength, and other factors. Furthermore, it should be understood that the first wireless network 10 may have more or fewer cells in alternate embodiments, or that the network 10 may alternatively not even use cells at all.

In the first wireless network 10, each of the cells 12a–g may employ one or more carrier frequencies for communication with mobile stations inside the cell. The number of carrier frequencies employed by a given cell may depend on various factors, such as the density of communication traffic expected in the site. In a congested city area, for example, a given cell may employ three or four carrier frequencies, while in a sparsely populated rural area, a cell may employ only one or two carrier frequencies. It should be understood that more or fewer carrier frequencies may be used within the network 10, depending on the desired functionality of the network 10.

Additionally in the first wireless network 10, the BTSs 14a–c may communicate with a base station controller ("BSC") 16a. Similarly, the BTSs 14d–g may communicate with a BSC 16b. Each of the BSCs 16a–b in turn may communicate with a communication device 18, which may be located at a Central Office (CO) of a telephone company. In the present embodiment, the communication device 18 may be, for example, a mobile switching center (MSC) or a media gateway providing connectivity to circuit-switches and BSCs. Alternatively, the communication device 18 may be a BSC that enables communication to other network components (e.g., MSCs, other BSCs, and/or circuit switches). The communication device 18 may also enable communication with one or more other networks, such as the second wireless network 30, the IP network 40, and/or the PSTN 50.

B. Exemplary BSCs

Typically, a BSC for a cell manages the air interface between a BTS and a mobile station that is currently operating in the cell. For example, FIG. 1 depicts two such mobile stations 22a–b within cells 12a–b, respectively. It should be understood that more or fewer mobile stations 22a–b may alternatively be present within each cell. In the present embodiment, the BSC 16a may control calls involving mobile stations 22a–b, respectively. The BSCs 16a–b may also be responsible for managing handoff of signaling and call traffic as a mobile station moves between cells 12a–g within the network 10. Additionally, the BSCs 16a–b may be responsible for controlling power levels and frequency allocation for the air interface between BTSs and mobile stations.

Furthermore, in the present embodiment, mobile stations in communication with the BSCs 16a–b may include Enhanced Variable Rate Codecs ("EVRCs") for converting analog voice signals from users into CDMA signals. The mobile stations may then send the resulting CDMA signals over an air interface to the BTSs 14a–g and in turn to the BSCs 16a–b. Thus, the BSCs 16a–b may also include EVRCs to convert the CDMA signals received from the mobile stations into Pulse Code Modulation (PCM) signals. The BSCs may perform vocoding by using their EVRCs if an answering terminal device is a non-mobile station. However, if an answering terminal device is a mobile station, the BSCs 16a–b may perform a vocoder bypass and pass the CDMA signal on to the answering terminal device without vocoding.

In the present embodiment, a CDMA signal can have a bandwidth of 8 Kilobytes or 13 Kilobytes, and a PCM signal may have a bandwidth of 64 Kilobytes, but it should be understood that this may vary in alternate embodiments. Additionally, although the present vocoders convert between CDMA and PCM signals, it should be understood that other types of vocoding or signal conversion mechanisms may also be used in the present embodiment. For example, an alternate vocoding mechanism may be used that converts, for example, between Global System for Mobile Communications (GSM) and PCM or Global Packet Radio Service (GPRS) and PCM.

The BSCs 16a–b may also include bypass mechanisms designed to bypass the EVRC vocoders. These bypass mechanisms can be implemented in hardware, software, or a combination of both. The bypass mechanisms may include, for example, any number of different components, such as computer-readable software programs, physical switches such as transistors designed for breaking data flow to the EVRC vocoders, circuit breakers, and so forth.

C. Exemplary communication device

In the present embodiment, the communication device 18 may control the BSCs 16a–b. Thus, the communication device 18 may serve as a general control element for the network 10. The communication device 18 may perform a number of duties, such as setting up and switching calls to and from the cells 12a–g, providing for backup in the case of cell failure, interfacing with the wireless network 10, monitoring traffic to facilitate billing, performing testing and diagnostic services, and performing other network management functions. Additionally, the communication device 18 may assign a frame selector for each call passing through it, and the frame selector may be a unique identification value that identifies each call.

The communication device 18 may also determine whether to perform vocoding or vocoder bypass. If the call originating from a mobile station is destined for another mobile station, the communication device 18 may pass a CDMA signal along to a destination BSC without vocoding the CDMA signal. The destination BSC may subsequently send the CDMA signal over the air interface to the destination mobile station. On the other hand, if the call is destined for a non-mobile station, then the originating BSC and/or the communication gateway 18 may decode the CDMA signal and send a PCM signal representative of the underlying voice signal to a circuit-switch for transmission to the destination non-mobile station.

D. Exemplary database

The first wireless network 10 may also include a database 20. The database 20 may employ any type of storage mechanism, such as a magnetic or optical hard disk drive, buffer, or memory unit (e.g., random access memory ("RAM"), read-only memory ("ROM"), programmable ROM ("PROM"), erasable PROM ("EPROM"), electrically erasable PROM ("EEPROM")). It should be understood that the database 20 may also use other storage mechanisms not described here.

In the present embodiment, the database 20 may store mappings of ESNs for terminal devices to device types. Thus, an intermediate entity (e.g., BSCs 16a–b, communication device 18) may query the database 20 with an ESN for a terminal device to determine the type of the terminal device (e.g., whether the device is mobile or non-mobile). The device types in the present embodiment may include mobile and non-mobile types, though in alternate embodiments, more specific device types that specify different information may also be provided. For example, the database 20 may alternatively include information such as the specific type of the terminal device (what type of mobile or non-mobile station it is), the make and model of the terminal device, the name of the owner of the terminal device, and the date of manufacture of the terminal device. It should be understood that the database 20 may alternatively store other types of data not described here.

E. Additional exemplary networks

The second wireless network 30 may be similar to the first wireless network 10, and may include any number of mobile devices. As depicted in FIG. 1, the second wireless network 30 includes a mobile station 32 and a PDA 34. The mobile station 32 may be similar to the mobile stations 22a–b and enable wireless communications with another endpoint. The PDA 34 may provide a user with wireless connectivity to any number of different networks, such as the networks 10, 30, 40, 50, 60. The second wireless network 30 may also include BSCs having vocoders, similar to the BSCs 16a–b. During vocoder bypass, the first wireless network 10 may use signaling such as ISUP signaling to prevent the second wireless network 30 from vocoding. It should be understood that the network 30 may alternatively include more or fewer components that are different than those described here. Also, it should be understood that wireless devices within the network system 8 (e.g., mobile stations 22a–b, 32, and PDA 34) may use any type of wireless channel (e.g., access channel, traffic channel, paging channel, etc.) when sending data.

The PSTN 50 may be a standard landline telephone network that includes any number of Signal Control Points (SCPs), Signal Switching Points (SSPs), Signal Transfer Points (STPs), COs, and non-mobile stations, such as a landline telephone 52. As mentioned previously, the IP network 60 may be any type of network that forwards and receives IP packets, such as the Internet. It should be understood that in alternate embodiments, the network system 8 may include more or fewer networks having different arrangements. For example, the network system 8 may alternatively include a TDMA network, an FDMA network, a GSM network, a Bluetooth network, and/or an 802.11 network.

It should be further understood that this and other arrangements described herein are illustrative only, and other arrangements and other elements (e.g., machines, interfaces, functions, etc.) can be used within the network system 8 instead. Additionally, some elements within the network system 8 may be omitted altogether. Further, as in most telecommunications applications, those skilled in the art will appreciate that many of the elements described herein are functional entities that may be implemented as discrete components, in any suitable combination and location.

For example, although FIG. 1 depicts the BSCs 16a–b and the communication device 18 as separate entities, the functions of the BSCs 16a–b may be integrated into the communication device 18, thereby eliminating the separate BSC entities 16a–b. Alternatively, the BSCs 16a–b may pass data between one another via an independent data connection (e.g., T1 line) that does not pass through the communication device 18. As another example, although FIG. 1 shows the BSCs 16a–b and BTSs 14a–g as separate entities, these two entities could be co-located or could otherwise be viewed cooperatively as a base station system (BSS). As still another example, while FIG. 1 shows the BTSs 14a–g grouped under the control of the two BSCs 16a–b, all of the BTSs 14a–g could instead be controlled by a common BSC. Further, as yet another example, the communication device 18 may instead be controlled by another entity, such as a session manager.

III. Exemplary MINs and ESNs

Figure 2:
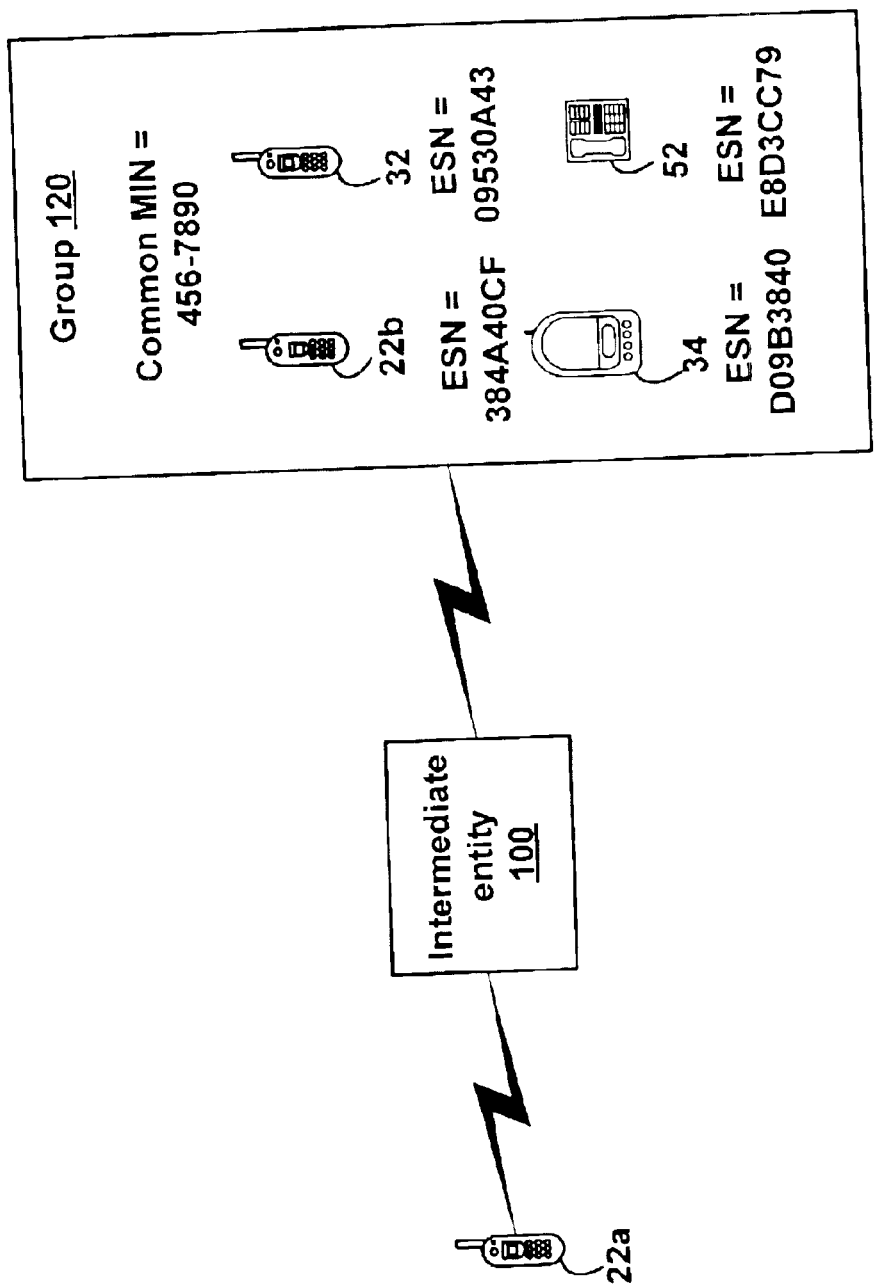
FIG. 2 shows the network system of FIG. 1 with a common mobile identification number (MIN) and unique electronic serial numbers (ESNS) assigned to terminal devices.

FIG. 2 shows the mobile station 22a communicating with one or more members of a group of terminal devices 120 via an intermediate entity 100. In the present embodiment, the intermediate entity 100 may include the BSCs 16a–b and/or the communication device 18, though any of the components within the network system 8 may alternatively be used. Additionally, functions performed by the intermediate entity 100 (e.g., BSCs 16a–b, communication device 18) may alternatively be performed by other components within the network system 8 (e.g., BTSs 14a–g, database 20). Also, the group of terminal devices 120 may include the mobile stations 22b, 32, the PDA 34, and the landline telephone 52, though any type and number of terminal devices may alternatively be used within the group of terminal devices 120.

As shown in FIG. 2, the terminal devices 22b, 32, 34, 52 may share a common MIN, which may be 24 bit number that represents a 7-digit telephone number provided by a network entity (e.g., intermediate entity 100, CO). In the present embodiment, the common MIN for the terminal devices 22b, 32, 34, 52 is "456–7890." It should be understood that other MINs may be used in alternate embodiments, and that alternate MINs may include any number of bits and digits.

Additionally, each of these terminal devices 22b, 32, 34, 52 may include a unique 32-bit ESN provided by a manufacturer of the device. For example, in the present embodiment, the mobile station 22b may have an ESN of "384A40CF" (hex), the mobile station 32 may have an ESN of "09530A43" (hex), the PDA 34 may have an ESN of "D09B3840" (hex), and the landline telephone may have an ESN of "E8D3CC79" (hex). It should be understood that an ESN may include any number or combination of bits. For example, the network system 8 may alternatively include a wireless portable computer that has a 48-bit ESN that encodes for decimal digits and ASCII characters.

The present network system 8 may use the ESNs for the terminal devices 22b, 32, 34, 52 to determine whether to perform vocoder bypass. For example, in an exemplary scenario, the mobile station 22a may initiate a wireless call to device(s) having the MIN "456–7890", which corresponds to the members of the group 120. Thus, the intermediate entity 100 (e.g., BSC(s) 16a–b, communication device 18, etc.) may use this common MIN to page the members of the group 120, each of which may ring or otherwise alert a user in response to the page. The user may then perform an action on a terminal device (e.g., pick up the phone) that causes the terminal device to answer the page by sending its ESN to the intermediate entity 100.

The intermediate entity 100 may then query the database 20 with the ESN of the answering terminal device. As mentioned previously, the database 20 may correlate ESNs of terminal devices to device types. Thus, the intermediate entity 100 may use the database 20 to determine whether the answering terminal device is a mobile station. If the answering terminal device is a mobile station (e.g., mobile station 22b), the intermediate entity 100 may perform vocoder bypass using a bypass mechanism, which can be implemented in software, hardware, or a combination of both. If the answering terminal device is a non-mobile station (e.g., landline telephone 52), the intermediate entity 100 may perform standard vocoding.

It should be noted that at the time when the intermediate entity 100 receives the ESN for the answering terminal device, data received from the answering terminal device may be vocoded (e.g., converted to PCM data) and may not be recognizable as having come from a mobile station. Thus, the intermediate entity 100 may be unable to determine whether the answering terminal device is mobile or non-mobile at this stage simply from the type of data received. In the present embodiment, the intermediate entity 100 may determine whether the answering terminal device is mobile or non-mobile by using its ESN to query the database 20. Alternatively, a PCM signal received from the answering terminal device may include a tag or other information that identifies, without a database lookup, whether the answering terminal device is mobile or non-mobile.

Additionally, in other embodiments, multiple terminal devices within the group 120 may respond to a page simultaneously, and the network system 8 may apply a contention protocol, such as Carrier Sense Multiple Access/Collision Detection (CSMA/CD) and/or CSMA/Collision Avoidance (CSMA/CA), to resolve this situation. Alternatively, when multiple terminal devices answer a page, each may receive data from the mobile station that initiated the call, and multicast communication between the terminal devices and the initiating mobile station may occur.

IV. Exemplary vocoder bypass

Figure 3:
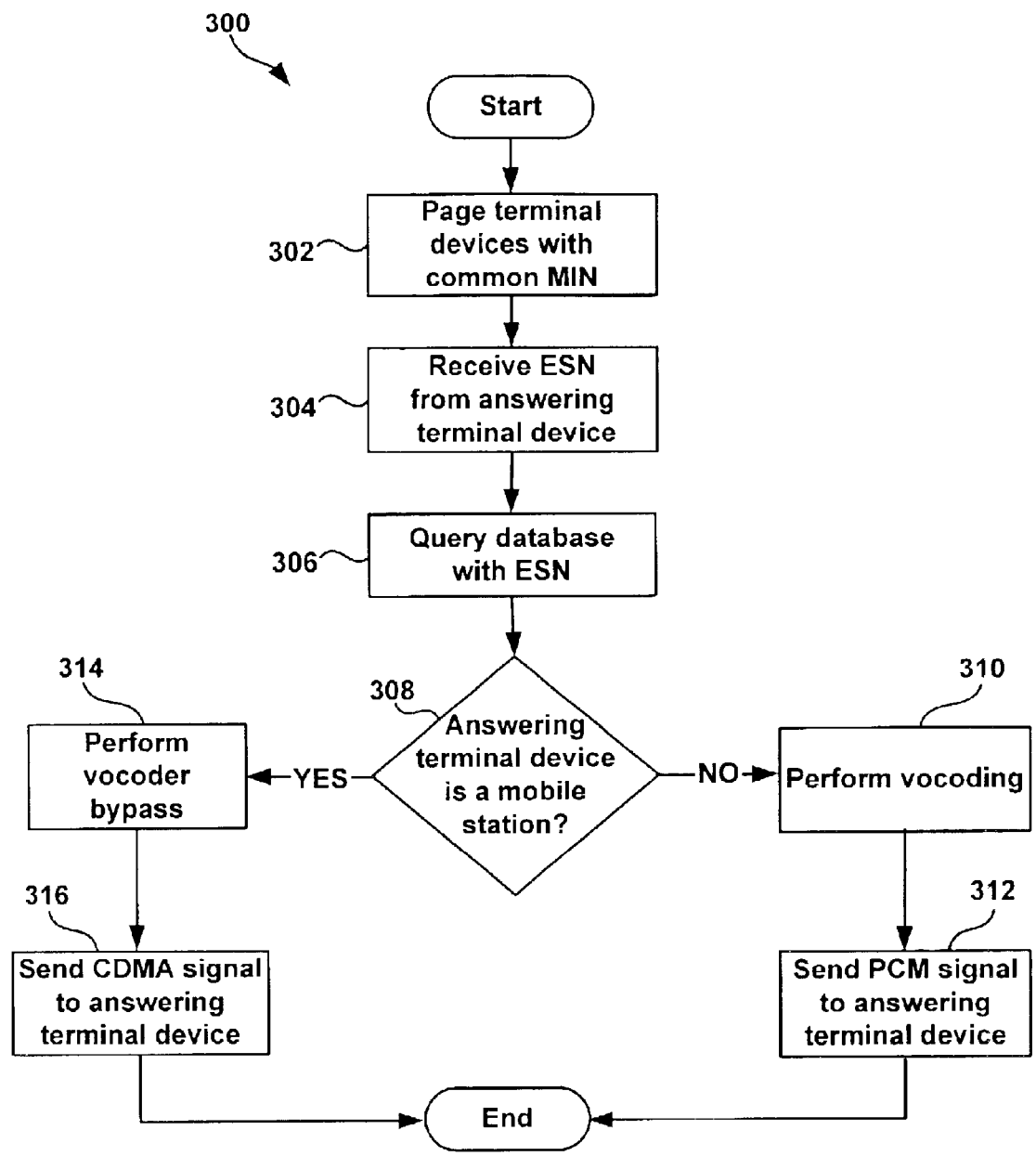
FIG. 3 shows an exemplary method of performing vocoder bypass within the network system of FIGS. 1 and 2.

Turning now to FIG. 3, an exemplary method 300 is shown for performing vocoder bypass using the exemplary embodiments shown in FIGS. 1 and 2. In step 302, a mobile station (e.g., mobile station 22a) may use the intermediate entity 100 to page each member of a group of terminal devices 120 by a common MIN (e.g., telephone number). In step 304, a member of the group of terminal devices answers the page by sending its ESN to the intermediate entity 100. As mentioned previously, in alternate embodiments, multiple terminal devices may answer the page simultaneously, and the intermediate entity 100 may employ a contention protocol to decide which terminal device is the answering terminal device.

In step 306, the intermediate entity 100 queries the database 20 with the ESN for the answering terminal device. As described earlier, the database 20 may correlate ESNs to device types (e.g., whether the device is a mobile or non-mobile station). The database 20 may then provide the device type for the answering terminal device to the intermediate entity 100.

In step 308, the intermediate entity 100 determines whether the answering terminal device is a mobile station. If the answering terminal device is not a mobile station, such as the landline telephone 52, the method 300 may proceed to step 310. During step 310, the intermediate entity 100 performs vocoding by converting CDMA signals sent from the initiating mobile station to PCM signals. At step 312, the intermediate entity sends the PCM signals to the answering terminal device (e.g., landline telephone 52).

Returning to the determination in step 308, if the answering terminal device is a mobile station, such as mobile station 32, the method 300 would proceed to step 314. At step 314, the intermediate entity 100 performs vocoder bypass. As mentioned previously, the intermediate entity 100 may employ a bypass mechanism (e.g., software code, physical switch, etc.) to prevent the use of the vocoder. Additionally, the intermediate entity 100 may inform a BSC or other component responsible for vocoding within the second wireless network 30 not to perform vocoding on CDMA signals for this call, since the intermediate entity 100 is employing vocoder bypass. Then at step 316, the intermediate entity forwards CDMA signals from the initiating mobile station to the answering terminal device (e.g., mobile station 32).

It should be understood that a wide variety of changes and modifications may be made to the embodiments of the network system 8 described above. For example, although the present embodiments discuss using ESNs for performing vocoder bypass, these embodiments may also use ESNs for enabling other types of bypassing that are specific to communication between two stations sharing a common device type (e.g., communication between two PDAs). Furthermore, certain components, functions, and operations of the network system 8 of the present embodiments may be accomplished with hardware, software, or a combination of both. It is therefore intended that the foregoing description illustrates rather than limits this invention, and that it is the following claims, including all equivalents, that define this invention:

What is claimed is:

1. A method for performing vocoder bypass carried out at an intermediate entity within a wireless telecommunications network, the method comprising:

receiving a request to establish a call from a first station of a first device type to a common identifier shared by a group of terminal devices;

receiving an electronic serial number from a member device of the group of terminal devices, wherein the electronic serial number is a unique identifier that distinguishes the member device from other terminal devices sharing the common identifier, and wherein the member device has a second device type;

using the electronic serial number to determine whether the second device type is the same as the first device type; and performing vocoder bypass if the second device type is the same as the first device type.

2. The method of claim 1, wherein using the electronic serial number to determine whether the second device type is the same as the first device type comprises using the electronic serial number to query a database that correlates a plurality of electronic serial numbers with a plurality of device types.

3. The method of claim 1, wherein the intermediate entity comprises at least one of a base station controller, mobile switching center, and a media gateway.

4. The method of claim 1, wherein the Intermediate entity includes an Enhanced Variable Rate Codec for performing vocoding.

5. The method of claim 1, wherein the first device type identifies the first station as a mobile station, and the second device type identifies the member device as a mobile station.

6. The method of claim 5, wherein the member device shares a mobile identification number with a non-mobile station.

7. The method of claim 5, wherein at least one of the first station and the member device is a cellular phone, a personal digital assistant, or a portable computer.

8. A computer readable medium having stored therein instructions for causing a processor to execute the steps of the method of claim 1.

9. A method for establishing a call, the method comprising:

receiving from a first mobile station a request to establish a call to a common identifier shared by a group of terminal devices;

paging each member of the group of terminal devices with the common identifier;

receiving an electronic serial number from an answering terminal device within the group of terminal devices in response to paging each member of the group, wherein the electronic serial number is a unique identifier that distinguishes the answering terminal device from other terminal devices sharing the common identifier; and querying a database using the electronic serial number to determine whether the answering terminal device is a second mobile station.

10. The method of claim 9 further comprising performing vocoder bypass if the answering terminal device is a second mobile station.

11. The method of claim 9, wherein the database stores a mapping between a plurality of electronic serial numbers and a respective device type for each of the plurality of electronic serial numbers.

12. The method of claim 9, wherein the common identifier is a mobile identification number.

13. The method of claim 9, wherein the group of terminal devices comprises the second mobile station and a non-mobile station.

14. A computer readable medium having stored therein instructions for causing a processor to execute the steps of the method of claim 9.

15. An intermediate system in communication with a first mobile station and a terminal device, wherein the terminal device is a member of a group of terminal devices sharing a common identifier, the intermediate system comprising:

an intermediate entity including a code and a bypass mechanism; and a database mapping electronic serial numbers of a plurality of devices to a type for each device;

wherein the intermediate entity receives from the terminal device an electronic serial number that distinguishes the terminal device from other terminal devices sharing the common identifier, wherein the intermediate entity determines a device type of the terminal device by querying the database with the electronic serial number, and wherein the bypass mechanism prevents the codec from performing vocoding if me terminal device is a second mobile station.

16. The intermediate system of claim 15, wherein the terminal device shares the common identifier with a non-mobile station.

17. The intermediate system of claim 15, wherein the codec comprises an Enhanced Variable Rate Codec for converting between a Code-Division Multiple Access signal and a Pulse Code Modulation signal.

18. The intermediate system of claim 15, wherein the bypass mechanism comprises at least one of a software program and a physical switch.

19. The immediate system of claim 15, wherein the intermediate entry comprises at least one of a base station controller, a mobile switching center, and a media gateway.

* * * * *